United States Patent
Kim et al.

(10) Patent No.: US 9,758,604 B2
(45) Date of Patent: Sep. 12, 2017

(54) METHOD FOR PREPARING VINYL CHLORIDE-BASED RESIN BY USING SUSPENSION POLYMERIZATION

(71) Applicant: LG CHEM, LTD., Seoul (KR)

(72) Inventors: Kun Ji Kim, Daejeon (KR); Yong Jin Kim, Daejeon (KR); Kyung Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 149 days.

(21) Appl. No.: 14/395,978

(22) PCT Filed: Oct. 11, 2013

(86) PCT No.: PCT/KR2013/009113
§ 371 (c)(1),
(2) Date: Oct. 21, 2014

(87) PCT Pub. No.: WO2014/098360
PCT Pub. Date: Jun. 26, 2014

(65) Prior Publication Data
US 2015/0141569 A1    May 21, 2015

(30) Foreign Application Priority Data

Dec. 18, 2012  (KR) .................. 10-2012-0148176
Sep. 30, 2013  (KR) .................. 10-2013-0116248

(51) Int. Cl.
*C08F 114/06*    (2006.01)
*C08K 3/04*    (2006.01)
*C08K 5/00*    (2006.01)

(52) U.S. Cl.
CPC .............. *C08F 114/06* (2013.01); *C08K 3/04* (2013.01); *C08K 5/005* (2013.01)

(58) Field of Classification Search
CPC .......... C08F 114/06; C08K 3/04; C08K 5/005; C08L 27/06
USPC ........................................ 524/567; 526/344.2
See application file for complete search history.

(56) References Cited

U.S. PATENT DOCUMENTS

| | | | |
|---|---|---|---|
| 5,087,678 A | | 2/1992 | Noguki et al. |
| 5,357,011 A | * | 10/1994 | Ohnishi ................. C08F 14/06 526/228 |
| 5,908,905 A | * | 6/1999 | Nakano ................... C08F 14/06 526/228 |

FOREIGN PATENT DOCUMENTS

| | | |
|---|---|---|
| JP | 2000-063403 A | 2/2000 |
| JP | 2007-284510 | 11/2007 |
| KR | 10-2008-0018082 A | 2/2008 |
| KR | 10-2010-0040930 A | 4/2010 |
| KR | 1020120035261 | 4/2012 |
| KR | 10-2012-0130439 A | 12/2012 |
| KR | 10-2012-0130801 A | 12/2012 |

OTHER PUBLICATIONS

Tsou et al., Encyclopedia of Polymer Science and Technology, vol. 10, "Fillers," Table 1, John Wiley & Sons, Inc., 2004.*

* cited by examiner

*Primary Examiner* — Josephine Chang
(74) *Attorney, Agent, or Firm* — Dentons US LLP

(57) ABSTRACT

Disclosed is a method of preparing a vinyl chloride based resin by suspension polymerization to prevent foaming by slowly elevating reaction temperature such that pressure is maintained when pressure drops in a late stage of reaction. According to the method, the vinyl chloride based resin is prepared using suspension polymerizing vinyl chloride based monomers so as to reduce foaming and improve a protrusion, thermal stability and the like.

3 Claims, No Drawings

METHOD FOR PREPARING VINYL CHLORIDE-BASED RESIN BY USING SUSPENSION POLYMERIZATION

This application is a 35 USC §371 National Stage entry of International Application No. PCT/KR2013/009113, filed on Oct. 11, 2013, and claims priority to Korean Application Nos. 10-2012-0148176, filed on Dec. 18, 2012, and 10-2013-0116248, filed Sep. 30, 2013, all of which are hereby incorporated by reference in their entirety for all purposes as if fully set forth herein.

TECHNICAL FIELD

The present invention relates to a method of preparing a vinyl chloride based resin, and more particularly to a method of preparing a vinyl chloride based resin to improve quality of a protrusion and thermal stability induced by residual initiator by preventing pressure drop and foam generation by slowly elevating polymerization temperature to a certain temperature per minute when pressure drops in the late stages of reaction during preparation of a vinyl chloride based resin to improve quality of the vinyl chloride based resin.

BACKGROUND ART

Vinyl chloride based resins are inexpensive as well as having characteristics such as superior processability, chemical resistance, durability, dielectric property, and the like. Due to such characteristics, vinyl chloride based resins are used as hard and soft materials in pipes, wall papers, window frames, wire covers, wrap films, sheets, and the like. However, since vinyl chloride based resins are broadly utilized and customer demand for processability has been rising, continuous improvement in processability is required.

Generally, the processability of a vinyl chloride based resin is affected by factors such as porosity of particles, particle diameter, particle distribution and morphology. The meltability of resins has been improved by controlling the factors. The meltability of resins is estimated by a protrusion or fish-eyes, which is a quality standard to estimate the meltability. Quality of a final product is estimated by generation of a protrusion or fish-eyes.

Quality degradation of the protrusion is caused by variation in metability among particles. In addition, generation of unmelted particles is related to the foam generated during reaction. In detail, foam is generated when a reflux condenser is often utilized in the late of the reaction and at the same time, pressure drops. At this time, dry foam including particles floats in an upper portion of a reactor and in a reflux condenser. However, since it is difficult to sufficiently wash all batches, particles floated by the foam remain inside the reactor and reflux condenser. The remaining particles are introduced into subsequent reactions and thereby, repolymerized. As a result, large and low porosity particles are generated. Due to such particles having low meltability, quality of the protrusion deteriorates.

Prior art to solve the problem is described in U.S. Pat. No. 5,087,678 and Japanese Application Pub. No. 2007-284510. In the patent literature, a method using an antifoaming agent alone or in combination with other additives has been used to inhibit foaming during the reaction. However, by the method using the antifoaming agent alone, it is difficult to inhibit generation of the dry foam. Furthermore, by adding an antifoaming agent and additives into the reactor during the reaction, expenses for equipment, an antifoaming agent and additives are increased. Additionally, resin quality may deteriorate due to addition of the antifoaming agent

DISCLOSURE

Technical Problem

Therefore, the present invention has been made in view of the above problems, and it is an object of the present invention to prevent pressure drop and foaming by elevating polymerization temperature to a certain temperature per minute so as to inhibit repolymerization and scale formation.

It is a further object of the present invention to provide a method of preparing a vinyl chloride based resin having characteristics such as reduction of a protrusion and superior thermal stability by reducing an amount of residual initiators after polymerization reaction is finished by inducing decomposition of the initiators according to the elevated temperature and thereby, not having scale generation, or quality problems by a protrusion or thermal stability observed in conventional methods.

The above and other objects can be accomplished by the present invention described below.

Technical Solution

In accordance with one aspect of the present invention, the above and other objects can be accomplished by the provision of a method of preparing a vinyl chloride based resin using suspension polymerization, wherein polymerization temperature is elevated when pressure drops in the late stages of reaction.

In accordance with another aspect of the present invention, provided is a method of preparing the vinyl chloride based resin, wherein the temperature is elevated at a temperature elevation rate of greater than 0.008° C./min and less than 0.8° C./min for greater than 10 minutes and less than 90 minutes when reaction pressure is reduced to greater than 0.01 kgf/cm$^2$ and less than 0.5 kgf/cm$^2$ after initiation of suspension polymerization.

The reduced reaction pressure is, for example, greater than 0.01 kgf/cm$^2$ and less than 0.2 kgf/cm$^2$.

The temperature elevation rate is, for example, greater than 0.008° C./min and less than 0.65° C./min.

The temperature elevation rate may control, for example, temperature control system.

The polymerization reaction temperature is, for example, 30 to 80° C.

The temperature elevation is carried out, for example, for 30 to 60 minutes.

In accordance with another aspect of the present invention, provided is a vinyl chloride based resin prepared by the method.

A concentration of residual initiator is, for example, less than 0.002 parts by weight based on 100 parts by weight of the vinyl chloride based resin.

In accordance with another aspect of the present invention, provided is a vinyl chloride based resin composition comprising the vinyl chloride based resin, an inorganic filler and a stabilizer.

The inorganic filler is, for example, carbon black.

The number of fish-eyes (thickness: 0.3 mm, area: 400 cm$^2$) of the vinyl chloride based resin composition is less than 10.

In accordance with another aspect of the present invention, provided is a method of preparing a vinyl chloride based resin, wherein temperature is elevated at a rate of 0.01 to 0.5° C./min for 20 to 60 minutes when reaction pressure is reduced to 0.05 to 0.1 kgf/cm² after initiation of suspension polymerization reaction.

Advantageous Effects

As apparent from the fore-going, the present invention advantageously provides a method of preparing a vinyl chloride based resin using suspension polymerization. Temperature elevation rate is controlled according to each polymerization temperature in a step of preparing the vinyl chloride based resin and thereby, pressure drop occurring in the late stages of the polymerization reaction is prevented. Foam is generated when pressure drop and at the same time, heat of a reflux condenser is removed. Here, the heat removal increases in the late stages of the polymerization reaction. Thus, foam generation is inhibited by controlling the temperature elevation rate. In addition, problems such as protrusion quality and thermal stability induced by scale and repolymerization observed in the prior art is solved.

BEST MODE

To solve drawbacks of the prior art, the present invention provides a method of preparing a resin, quality of which is improved by inhibiting foaming which may occur when a reflux condenser is often utilized and at the same time, pressure drops by preventing pressure drop by slowly elevating temperature at the time of pressure drop in the late stages of reaction, and by inducing decomposition of an initiator remaining in the late stages of reaction.

According to the present invention, foam is not generated after reaction and thereby, inflow of repolymerizable particles is prevented. In addition, residual initiator does not remain in the reactor. Thus, thermal stability is improved and, as such, quality is improved.

The present invention relates to a method of preparing a vinyl chloride based resin using suspension polymerization by controlling polymerization temperatures and polymerization initiators, dependent on each polymerization degree. The method of preparing the vinyl chloride based resin controls foaming by preventing pressure drop occurring in the late stages of reaction by elevating polymerization temperature in the late stages of reaction to minimize foaming during reaction and an amount of residual initiator.

Hereinafter, the present invention is described in detail.

In the prior art, heat removal and polymerization conversion ratio are increased by use of a reflux condenser in the late stages of reaction and thereby, dry foam including particles is generated when pressure drops in the late stages of reaction. The present invention provides a new method of preparing the vinyl chloride based resin to accomplish quality improvement by solving problems such as scale and repolymerization generated in an upper portion of the reactor and reflux condenser, and a large amount of residual initiator, which occur by the generated dry foam.

To accomplish the above described properties, the present invention controls pressure drop by elevating temperature at a rate of greater then 0.008° C. and less than 0.8° C. per minute when pressure drops in the late stages of reaction such that the elevated temperature is not greater than heat removal limitation of the reactor so as to improve the meltability of a final resin obtained by preventing foam generation according to pressure change. The temperature is elevated at a rate of, preferably, 0.01° C. or more and less than 0.65° C., or 0.02 to 0.65° C., more preferably, 0.05 to 0.6° C., per minute. When pressure drops in the late stages of reaction, temperature is elevated rapidly, and pressure and reaction become unstable by controlling the elevating temperature to be higher than the above temperature ranges and, as such, resin quality deteriorates. On the other hand, when the elevating temperature is below the above temperature ranges, the temperature is elevated slowly, resulting in pressure drop. As a result, problems identical to the problems observed in the prior art occur.

In the present invention, temperature elevation is initiated when the reactor pressure falls to 0.01 kgf/cm² to 0.5 kgf/cm² in the late stages of reaction. Preferably, temperature is elevated when pressure drops to 0.05 kgf/cm² or more and less than 0.2 kgf/cm². When temperature is elevated before pressure drops to the range, pressure change for the elevated temperature occurs and the reaction becomes unstable, deteriorating resin quality. In addition, when temperature is elevated after pressure drops to pressure greater than the ranges, foam including particles which occurs by heat removal and pressure drop is generated. As a result, a protrusion and inner scale of the reactor are generated, deteriorating resin quality.

Generally, polymerization temperature is determined by the degree of polymerization of a resin. Generally utilized temperature is determined in temperature range of 55 to 60° C. for a resin having a number average degree of polymerization of 1000, 61 to 65° C. for a resin having a number average degree of polymerization of 800, and 66 to 70° C. for a resin having a number average degree of polymerization of 700.

In the present invention, the polymerization temperature is, preferably, within temperature range of 30 to 80° C. More preferably, the polymerization temperature is within temperature range of 40 to 70° C. Even more preferably, the polymerization temperature is within temperature range of 50 to 65° C.

Degree of polymerization means the number of repeat units, namely, monomers, constituting polymers. In the present invention, number average degree of polymerization is utilized.

According to the polymerization temperature, reaction pressure is changed and thereby, degree of pressure drop is changed. Thus, the temperature elevation rate is controlled, depending on difference of reduced pressure in the late stages, such that reaction stability is not disturbed.

Additionally, time to elevate the polymerization temperature by generation of pressure drop is 30 to 60 minutes, preferably, 30 to 50 minutes, more preferably 30 to 40 minutes, from the time when pressure drops.

The process of elevating the polymerization temperature is carried out until reaction is finished. Here, time taken to elevate the polymerization temperature does not have great influence on overall polymerization time. When the time is too short, after elevation is stopped, pressure rapidly drops and thereby, foaming may increase. As a result, a protrusion and scale are generated. In addition, when the time is too long, inner morphologies of particles are affected and output per unit time is reduced since the polymerization time is greatly extended. Additionally, the outmost range of elevation temperature should be in a range of 30 to 80° C., as proposed previously.

Initiators suitable for the polymerization may comprise at least one selected from peroxides such as α,α'-bis(neodecanoyl peroxy)diisopropyl benzene, cumene peroxyneodecanoate, di-n-propylperoxydicarbonate, Diisopropyl peroxy dicarbonate, 1,1,3,3-tetramethylbutyl peroxyneodecanoate, bis(4-t-butyl cyclohexyl) peroxy dicarbonate, 1-cyclohexyl- 1-methylethyl peroxyneodecanoate, di-2-ethoxyethyl peroxy dicarbonate, di-2-ethylhexyl peroxy dicarbonate, t-hexyl peroxyneodecanoate, dimethoxybutyl peroxy dicarbonate, bis(3-methyl-3-methoxybutyl) peroxy dicarbonate, t-butyl peroxyneodecanoate, t-hexyl peroxypivalate and the like, and azo compounds such as 2,2'-azobis(2,4-dimethylvaleronitrile), 2,2'-azobis(isobutyronitrile), dimethyl 2.2'-azobis(isobutyrate) and the like, although the present invention is not limited thereto.

An amount of the polymerization initiator input to the reactor is identical to an amount of polymerization initiator utilized in a conventional polymerization process. Thus, the polymerization initiator is used in an amount of 0.02 to 0.3 parts by weight or 0.03 to 0.2 parts by weight, preferably, 0.04 to 0.15 parts by weight, based on 100 parts by weight of the vinyl chloride based monomer.

The present invention provides the vinyl chloride based resin prepared according to the method of the present invention.

In the vinyl chloride based resin, residual initiator is added in amount of less than 0.002 parts by weight, or 0.0005 to 0.0015 parts by weight, preferably, 0.0006 to 0.001 parts by weight, based on 100 parts by weight of the vinyl chloride based resin.

For reference, the vinyl chloride based resin of the present invention comprises a resin consisting of the vinyl chloride monomers alone and a resin consisting of a copolymer (an amount of the vinyl chloride monomer is greater than 50 wt %, based on total composition of the resin) of the vinyl chloride monomer, which is a main ingredient, and a vinyl based monomer which is copolymerized with the vinyl chloride monomer.

The vinyl based monomer which is copolymerized with the vinyl chloride monomer may comprise at least one selected from the group consisting of olefin compounds such as ethylene, propylene and the like; vinyl esters such as vinyl acetate, vinyl propionate and the like; unsaturated nitriles such as acrylonitrile and the like; vinyl alkyl ether such as vinyl methyl ether, vinyl ethyl ether and the like; unsaturated fatty acids such as acrylic acid, methacrylic acid, itaconic acid, maleic acid and the like; and anhydrides of the fatty acids.

Hereinafter, preferred examples will be provided for better understanding of the present invention. It will be apparent to those skilled in the art that these examples are only provided to illustrate the present invention and various modifications and alterations are possible within the scope and technical range of the present invention. Such modifications and alterations fall within the scope of claims included herein.

EXAMPLE

Example 1

100 parts by weight of a vinyl chloride monomer, 130 parts by weight of deionized water, 0.04 parts by weight of polyvinyl, which is a dispersing agent, having degree of saponification of 72%, and 0.02 parts by weight of 55% of polyvinyl, which is a dispersing agent, were input to a one cubic meter reactor.

0.02 parts by weight of t-butyl peroxyneodecanoate (BND) as a polymerization initiator was input to the reactor. Thereafter, the reactor was stirred after being depressurized, to remove air and nitrogen.

The reactor was heated and maintained at polymerization temperature of 58° C. When inner pressure of the reactor in the late stages of reaction drops to about 0.1 kgf/cm², temperature was elevated at a rate of 0.2° C. per minute by controlling the polymerization temperature with steam or cooling water having a certain temperature, to maintain pressure. After elevating the temperature for about minutes, the temperature was not elevated any longer. When the pressure reached on 7.0 kgf/cm², the reactor was cooled and then reaction was stopped by adding 0.02 parts by weight of Irganox 245 and 0.01 parts by weight of sodium hydrogen carbonate, as antioxidants. By out-gassing, un-reacted vinyl chloride monomer and vinyl chloride resin slurry were collected.

The collected slurry was washed and dried to obtain a vinyl chloride resin polymer having a number average polymerization degree of 1000.

Example 2

A vinyl chloride resin polymer having a number average polymerization degree of 1000 was prepared by repeating polymerization in the same manner as in Example 1, except that temperature was elevated at a rate of 0.4° C. per minute when pressure drops in the late stages of reaction.

Example 3

A vinyl chloride resin polymer having a number average polymerization degree of 1000 was prepared by repeating polymerization in the same manner as in Example 1, except that temperature was elevated at a rate of 0.6° C. per minute when pressure drops in the late stages of reaction.

Example 4

The vinyl chloride resin polymer having a number average polymerization degree of 1000 was prepared by repeating polymerization in the same manner as in Example 1, except that polymerization temperature was elevated at a rate of 0.05° C. per minute when pressure drops in the late stages of reaction.

Example 5

A vinyl chloride resin polymer having a number average polymerization degree of 1000 was prepared by repeating polymerization in the same manner as in Example 1, except that polymerization temperature was increased when pressure drop was 0.05 kgf/cm² in the late stages of reaction.

Example 6

A vinyl chloride resin polymer having a number average polymerization degree of 1000 was prepared by repeating polymerization in the same manner as in Example 1, except that except that polymerization temperature was increased when pressure drop was 0.15 kgf/cm² in the late stages of reaction.

Example 7

A vinyl chloride resin polymer having a number average polymerization degree of 1000 was prepared by repeating polymerization in the same manner as in Example 1, except that temperature was elevated for 30 minutes after pressure drops in the late stages of reaction pressure drop.

Example 8

A vinyl chloride resin polymer having a number average polymerization degree of 1000 was prepared by repeating polymerization in the same manner as in Example 1, except that temperature was elevated for 50 minutes after pressure drops in the late stages of reaction pressure drop

Comparative Example 1

To test a method of preparing the vinyl chloride resin in Example 1, a vinyl chloride resin polymer having a number average polymerization degree of 1000 was prepared by repeating polymerization in the same manner as in Example 1, except that polymerization temperature was not elevated after pressure drops in the late stages of reaction.

Comparative Example 2

A vinyl chloride resin polymer having a number average polymerization degree of 1000 was prepared by repeating polymerization in the same manner as in Example 1, except that polymerization temperature was elevated at a rate of 0.008° C. per minute from when pressure drops in the late stages of reaction.

Comparative Example 3

A vinyl chloride resin polymer having a number average polymerization degree of 1000 was prepared by repeating polymerization in the same manner as in Example 1, except that polymerization temperature was elevated at a rate of 0.8° C. per minute from when pressure drops in the late stages of reaction.

Comparative Example 4

A vinyl chloride resin polymer having a number average polymerization degree of 1000 was prepared by repeating polymerization in the same manner as in Example 1, except that pressure dropped to 0.01 kgf/cm$^2$ in the late stages of reaction.

Comparative Example 5

A vinyl chloride resin polymer having a number-average polymerization degree of 1000 was prepared by repeating polymerization in the same manner as in Example 1, except that pressure dropped to 0.5 kgf/cm$^2$ in the late stages of reaction.

Comparative Example 6

A vinyl chloride resin polymer having a number average polymerization degree of 1000 was prepared by repeating polymerization in the same manner as in Example 1, except that temperature was elevated for 10 minutes after pressure drops in the late stages of reaction pressure drop.

Comparative Example 7

A vinyl chloride resin polymer having a number average polymerization degree of 1000 was prepared by repeating polymerization in the same manner as in Example 1, except that temperature was elevated for 90 minutes after pressure drops in the late stages of reaction pressure drop.

Comparative Example 8

A vinyl chloride resin polymer having a number average polymerization degree of 1000 was prepared by repeating polymerization in the same manner as in Example 1, except that polymerization reactor temperature was elevated irregularly up to temperature of 70° C. from 58° C. by stopping supply of cooling water to a jacket after pressure drops in the late stages of reaction

Test Example

Analysis of the vinyl chloride resin prepared in Examples 1 to 8 and Comparative Examples 1 to 8 was performed in accordance with the following methods.

A number average degree of polymerization: measured in accordance with ASTM D1243-79.

Polymerization time: measured from when a polymerization initiator was input to the reactor to when the reaction was finished.

Whiteness index: roll-milling was carried out at temperature of 180° C. for 3 minutes after inputting 5 parts by weight of a mixed stabilizer (WPS-60, lead based stabilizer, Songwon Industrial Co., Ltd.), 1.5 parts by weight of a processing material (PA-822, acrylic based processing material, LG Chemical) and 2 parts by weight of titanium oxide, based on resin 100 parts by weight of vinyl chloride based resin, into the reactor, to obtain a sheet having a thickness of 0.5 mm.

Thereafter, whiteness index (W.I) was measured using NR-3000 produced by Nippon Denshoku. Results are summarized in the following Tables 1 and 2. Thermal stability was estimated by the whiteness index. Increasing whiteness index indicates improved thermal stability.

Concentration of residual initiator: an amount of initiator present in the vinyl chloride based resin was measured by an iodometric titration method. In detail, after mixing 50 parts by weight of the resin and 80 parts by weight of isopropyl alcohol (IPA), 20 ml of 10% acetic acid solution and 20 ml of 10% potassium iodide solution were input to the mixture and then, were mixed sufficiently with the mixture.

The number of fish-eyes: 100 parts by weight of the vinyl chloride based resin, 45 parts by weight of DOP, barium stearate 0.1 parts by weight, 0.2 parts by weight of a tin based stabilizer and 0.1 parts by weight of carbon black were mixed and mulled at temperature of 140° C. for 5 minutes with a six inch roll to prepare a sheet having a thickness of 0.3 mm. The number of fish-eyes means the number of white and transparent particles present in 400 cm$^2$ of the sheet.

Particle size distribution: the particle diameter of the obtained resin was measured with HELOS particle size analyzer produced by Sympatec. The particle size distribution was defined by span value. Here, deviation is small when the span value is low.

TABLE 1

| Items | Example 1 | Example 2 | Example 3 | Example 4 | Example 5 | Example 6 | Example 7 | Example 8 |
|---|---|---|---|---|---|---|---|---|
| Temperature elevation rate (° C./min) | 0.2 | 0.4 | 0.6 | 0.05 | 0.2 | 0.2 | 0.2 | 0.2 |

TABLE 1-continued

| Items | Example 1 | Example 2 | Example 3 | Example 4 | Example 5 | Example 6 | Example 7 | Example 8 |
|---|---|---|---|---|---|---|---|---|
| Pressure drop ($\Delta P$, kgf/cm$^2$) | 0.1 | 0.1 | 0.1 | 0.1 | 0.05 | 0.15 | 0.1 | 0.1 |
| Elevation time (min) | 35 | 35 | 35 | 35 | 35 | 35 | 30 | 50 |
| Polymerization time (min) | 264 | 264 | 263 | 267 | 261 | 268 | 260 | 280 |
| Whiteness index | 75 | 75 | 76 | 74 | 75 | 74 | 73 | 76 |
| Concentration of residual initiator (ppm) | 10 | 8 | 5 | 12 | 7 | 11 | 14 | 4 |
| Fish-eyes (No.) | 5 | 5 | 4 | 5 | 4 | 7 | 6 | 6 |

TABLE 2

| Items | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Temperature elevation time (° C./min) | — | 0.008 | 0.8 | 0.2 | 0.2 | 0.2 | 0.2 | — |
| Pressure drop ($\Delta P$, kgf/cm$^2$) | — | 0.1 | 0.1 | 0.01 | 0.5 | 0.1 | 0.1 | 0.1 |
| Elevation time (min) | — | 35 | 35 | 35 | 35 | 10 | 90 | 35 |
| Polymerization time (min) | 260 | 264 | 256 | 253 | 266 | 260 | 349 | 264 |
| Whiteness index | 72 | 72 | 68 | 73 | 72 | 71 | 69 | 74 |
| Concentration of residual initiator (ppm) | 35 | 26 | 2 | 13 | 8 | 29 | 3 | 8 |
| Fish-eyes (No.) | 10 | 11 | 16 | 20 | 23 | 12 | 38 | 15 |

As can be seen from Tables 1 and 2 above, whiteness indexes and fish-eyes in Example 1 carried out to prevent pressure drop by elevating temperature when pressure drops were improved, compared to whiteness indexes and fish-eyes of Comparative Example 1 where the polymerization temperature is not elevated in the late stages of reaction.

In addition, as described in Examples 2 to 3, the whiteness index and polymerization time could be controlled by controlling temperature elevation rate. As a result, the whiteness indexes and fish-eyes were improved.

In addition, decline in the number of fish-eyes was smaller when temperature elevation rate was too slow or too fast at the time of pressure drop as described in Comparative Examples 2 and 3.

In addition, when temperature was elevated after stopping supply of cooling water to a jacket as described in Comparative Example 8, the elevated temperature was not constant and thereby, it was difficult to suppress foaming. Thus, increase of fish-eyes was observed.

Therefore, in accordance with the present invention, pressure drop was prevented by elevating temperature to be higher than the polymerization temperature using the temperature control system, according to degree of pressure drop, in the late stages of the reaction where pressure drops. Additionally, a vinyl chloride based resin having a reduced number of fish-eyes and increased whiteness index efficiently was prepared by inhibiting foam generation due to pressure drop of the late stages of reaction and by a large amount of removed heat.

What is claimed is:

1. A method of preparing a vinyl chloride based resin, comprising:
    suspension polymerizing vinyl chloride based monomers in a reactor,
    during which a temperature of the reactor is increased at a rate of 0.01 to 0.2° C./min for 35 to 40 minutes when a reactor pressure at a stage of suspension polymerization decreases to 0.05 to 0.1 kgf/cm$^2$ after initiation of suspension polymerization.

2. The method according to claim 1, wherein the reactor is at a polymerization reaction temperature of 30 to 80° C. before the reactor pressure decreases.

3. The method according to claim 1, wherein a concentration of a residual initiator of the vinyl chloride based resin is less than 0.002 parts by weight based on 100 parts by weight of the vinyl chloride based resin.

* * * * *